United States Patent Office

Re. 25,444
Reissued Sept. 17, 1963

25,444

ELECTROPHOTOGRAPHIC RECORDING MEMBER AND PROCESS OF PRODUCING SAME

Thomas J. Kucera, Evanston, Ill., assignor to Charles Bruning Company, Inc., Mount Prospect, Ill., a corporation of Delaware No Drawing. Original No. 2,959,481, dated Nov. 8, 1960, Ser. No. 781,206, Dec. 18, 1958. Application for reissue Apr. 12, 1962, Ser. No. 188,922
11 Claims. (Cl. 96—1)

Matter enclosed in heavy brackets [ ] appears in the original patent but forms no part of this reissue specification; matter printed in italics indicates the additions made by reissue.

This invention relates to electrophotographic recording members and to processes of producing such members.

Electrophotographic recording members have been made by coating an electrically-conducting or semi-conducting substrate, usually paper, with a solution of a resin such as a silicone resin or a polyvinyl acetate resin in an organic solvent such as toluene, xylene or mixtures of these solvents. The finely divided photo-conductor is suspended in this solution. A preferred photo-conductor is zinc oxide, such, for example, as the photo-conductive zinc oxide sold by the New Jersey Zinc Company as Florence Green Seal 8. Other photo-conductors such as the oxides of antimony, aluminum, bismuth, cadmium, mercury, molybdenum, and lead; the iodides, selenides, sulfides or tellurides of these metals including zinc; selenium; arsenic trisulfide; lead chromate and cadmium arsenide have been suggested. The resinous vehicle forms an electrically-insulating binder for the photo-conductor.

Equipment required for the application of such organic solvent systems are usually costly, requiring solvent recovery systems and special equipment to maintain the atmosphere in the neighborhood of the coating appliances reasonably safe (i.e., no undue fire hazard) and non-toxic to the workmen. While the organic solvent coating procedures result in electrophotographic recording members having high dark resistivity, i.e., low dark decay, frequently they produce electrophotographic recording members in which the adhesion between the resinous coating layer and the substrate is relatively poor.

Attempts heretofore made to apply the resinuous vehicle or binder dispersed in an aqueous medium resulted in a coating of drastically diminished electrical insulating properties with consequent high dark decay. Such electrophotographic recording members also exhibit markedly increased sensitivity to moisture.

It is among the objects of the present invention to provide a process of producing electrophotographic recording members, which process does not involve the use of an organic solvent for the resinuous vehicle and hence requires no special coating equipment, permitting the use of conventional continuous web coating equipment without requiring any additional equipment for fire and health protection necessary when employing an organic solvent.

It is another object of this invention to provide such process employing an aqueous base for the resinous vehicle, which process results in a product having low dark decay, at least as good as the products produced by the organic solvent method, and further having the resinous vehicle firmly bonded to the substrate, especially when a paper substrate, as is preferred, is used.

It is still another object of the present invention to provide an electrophotographic recording member in which the resinuous vehicle is firmly bonded to the substrate and which has good dark decay properties, permitting its storage for relatively long periods of time before use to produce excellent electrostatic copies, i.e., copies which will readily receive an electrostatic charge on which a latent image of an original can be produced by exposure to light, which image can be rendered permanent by application of developer or toner followed by fixing of the image, all as is well known in the art of producing electrostatic copies.

Other objects and advantages of this invention will be apparent from the following description thereof.

In accordance with this invention the coating material applied to the electrically-conducting or semi-conducting substrate consists of a suspension of the finely divided photo-conductor in an aqueous medium containing an uncured melamine-formaldehyde resin having at least two mols of formaldehyde per mol of melamine, preferably at least 3 to 4 mols of formaldehyde per mol of melamine and from 1 to 8 preferably about 3 parts by weight of photo-conductor per part of total resin solids, and after application of this suspension to the substrate the coating is heated to effect curing of the melamine-formaldehyde resin. When a flexible substrate such as paper is used, the suspension of the finely divided photo-conductor also contains a thermoplastic resin in amount of from 10% to 90%, preferably 35% to 55%, by weight of thermoplastic resin based on the weight of total resin solids. Hence the present invention involves the application to the substrate of a suspension containing on a dry basis (not including the water) from 2 to 50, preferably 7 to 35, parts by weight of uncured melamine-formaldehyde resin, 0 to 40, preferably 6 to 30, parts by weight of thermoplastic resin and 50 to 88, preferably 50 to 85, parts by weight of photo-conductor.

The resultant electrophotographic recording member has the finely divided photo-conductor particles embedded in an electrically-insulating layer consisting of the melamine-formaldehyde resin alone or uniformly blended with the thermoplastic resin, when the latter resin is employed, which layer is firmly bonded with the substrate. The electrophotographic recording member has excellent electrophotographic properties, including low or long-time dark decay, at least as good as products made by organic solvent processes.

As the substrate paper is preferred, including high wet strength paper coated or uncoated, having a thickness of from 3 to 6 mils. Other electrically-conductive or semi-conductive materials may be used, such, for example, as plastic films including cellophane, cloth, and metallic foils, e.g., aluminum and copper foils.

The melamine-formaldehyde resin used may be dimethylol melamine (e.g., Resloom HP of Monsanto Chemical Co.); dimethyl trimethylol melamine (Aerotex M-3 or Parez 613 of American Cyanamid Co.); trimethylol melamine (Aerotex 605 or Parez 607 of American Cyanamid Co.); tetramethylol melamine (Resloom HP Special, Monsanto Chemical Co.); tetramethyl pentamethylol melamine (Resloom LC-48, Monsanto Chemical Co.); tetramethyl hexamethylol melamine; pentamethyl pentamethylol melamine; pentamethyl hexamethylol melamine; other alkylated melamine formaldehyde resins; or mixtures of such resins.

All of the above melamine formaldehyde resins contain at least 2 mols of formaldehyde per mol of melamine. It will be appreciated that the resins may be produced by reacting melamine with formaldehyde polymers or aqueous or alcoholic solutions of formaldehyde or formaldehyde polymers and that the reference to the number of mols of formaldehyde is to the number of mols present in the cured resin irrespective of the source of the formaldehyde.

The melamine-formaldehyde resin should be in a water-soluble condition, i.e., uncured or partially cured to a stage where it is still appreciably water-soluble when applied to the substrate alone or in admixture with the thermoplastic resin. It may be used with or without a curing catalyst. Any of the known curing catalysts for melamine-formaldehyde resin may be incorporated in the coating composition along with the melamine-formaldehyde and thermoplastic resin. Examples of such curing catalysts are zinc chloride, magnesium chloride, ammonium chloride, acids such as acetic or hydrochloric acid, phenyl biguanide hydrochloric, and diammonium phosphate. Only a small amount of the catalyst need be employed, enough to catalyze the curing of the resin. Usually from 1% to 5% by weight based on the weight of melamine-formaldehyde resin will suffice. The melamine-formaldehyde resin may be used alone when coating less flexible substrate such as metal foils or plastic films. In the treatment of flexible substrate such as paper, the thermoplastic resin should be used along with the melamine-formaldehyde resin; by so doing, cracking of the resin coating upon flexure of the substrate is minimized, if not completely prevented.

The thermoplastic resin should be compatible with the melamine-formaldehyde resin and blend therewith. By employing the mixture, a resin coating results which has good electrically-insulating properties, is tough and adherent to the substrate, particularly paper, and is not too brittle, i.e., will not crack or peel when the paper or other flexible substrate is flexed or bent. Examples of thermoplastic resins which can be used are:

(a) Vinyl acetate homopolymer (Gelva S–55, Shawinigan)
(b) Vinyl acetate octylacrylate copolymer (Resyn 2203, National Starch)
(c) Vinyl acetate vinyl chloride copolymer (Resyn 2507, National Starch)
(d) Vinylidene chloride vinyl chloride copolymer (Latex 744B, Dow Chemical)
(e) Vinylidene chloride acrylonitrile copolymer (Saran F122–A15, Dow Chemical)
(f) Acrylonitrile-butadiene copolymer (Hycar 1577, Goodrich)
(g) Styrene-butadiene copolymer (Latex 512R, Dow Chemical)
(b) Interpolymers of 2-ethylhexyl acrylate, styrene, acrylonitrile and methacrylic acid disclosed in United States patent 2,767,153 (Lytron 680, Monsanto Chemical Co.)

Preferred resin mixtures are mixtures of Parez 613 and Gelva S–55 in amount of from 35% to 55% by weight of the Gelva S–55 based on the weight of total resin solids.

The order of mixing the constituents to form the coating is not important. The photo-conductor, preferably finely divided zinc oxide having a particle size of about .2 micron, but any other photo-conductor including those mentioned above, may be dispersed in the melamine-formaldehyde resin with or without the aid of a dispersing agent such as the alkali metal salts of alkyl naphthalene sulfonic acids (Daxad No. 11 of Dewey and Almy Co., Cambridge, Massachusetts). The resultant dispersion is then mixed with an emulsion of the thermoplastic resin in water or a dispersion of the thermoplastic resin in water, in which dispersion the resin particles are in extremely finely divided, e.g., colloidal, form so that they will blend readily with the melamine-formaldehyde resin. Alternatively the melamine-formaldehyde resin may be blended with the aqueous emulsion or dispersion of the thermoplastic resin and the photo-conductor added to the mixture while agitating.

The coating mixture thus prepared contains from 1 to 43 parts of resin solids (melamine-formaldehyde, or mixture of melamine-formaldehyde and thermoplastic resin), from 10 to 85 parts of water, and from 10 to 75 parts of photo-conductor, with the ratio of photo-conductor to resin solids within the ranges of 1 to 1 to 8 to 1. The coating layer applied to the substrate may have any desired thickness; usually a thickness within the range of .2 to 1 mil gives satisfactory results.

After application of the coating mixture to the substrate which desirably is in web form and which coating can be carried out efficiently in conventional coating equipment (spraying, immersion or coating roll types) not requiring any special equipment to render the coating operation safe from either a fire or health standpoint, the coated substrate is subjected to a curing and drying treatment. For example, it may be passed through a curing oven maintained at the curing temperature. Curing may be effected at any temperature above about 180° F. and below the temperature at which charring or damage to the substrate may take place. Preferred curing temperature is within the range of 180° F. to 300° F., preferably about 240° F.–250° F. During this curing treatment residual moisture is removed from the insulating layer.

The time of cure will depend on the temperature and whether or not a catalyst is employed. Satisfactory cure can be obtained in from 1 to 5 minutes at 240° F.–250° F. without a curing catalyst in the coating mixture. In general the curing time may vary from 1 to 15 minutes; at 180° F. a longer curing time within this range is used and at about 250° F. a shorter curing time of about 1 to 5 minutes is used.

The resultant electrophotographic recording element, particularly when made with a paper substrate, has the electrically-insulating resin layer firmly bonded to the substrate and also has excellent electrical properties. The dielectric properties are at least as good as products made employing organic solvent resin solutions, yet the procedure of the present invention involves none of the disadvantages inherent in any procedure involving the use of such organic solvents.

The following examples of coating procedures embodying the invention are given for illustrative purposes. It will be understood the invention is not limited to these examples.

EXAMPLE I 600 parts of zinc oxide are dispersed in 60 parts of Parez 613 (80% solids, 20% water) employing 2 parts of a dispersing agent (Daxad No. 11). While agitating this dispersion 325 parts of polyvinyl acetate resin emulsion (51% solids, 49% water) (Resyn 25–1234) are added. After thorough mixing for about 45 minutes the dispersion is coated on paper to a thickness of 0.005 inch. The coated paper is then heated at 240° F.–250° F. for 5 minutes.

An electrophotographic recording element is thus produced at least as good as the zinc oxide coated paper made from a solution of silicone resin in a toluene-xylene mixture.

EXAMPLE II

This example differs from Example I chiefly in that the thermoplastic resin employed is Resyn 2507 and the proportion of the two resin constituents is 25% melamine-formaldehyde resin to 75% Resyn 2507. The results are the same as in Example I.

EXAMPLE III

This example differs from Example I chiefly in that it involves the use in the coating mixture of equal parts of melamine-formaldehyde resin and Resyn 2507 in a ratio of 1 part resin solids to 1 part water and 2 parts zinc oxide. An eminently satisfactory electrophotographic recording element results.

EXAMPLE IV

This example differs from Example I in that it involves the use of red mercuric iodide as the photoconductor and the use of a resin mixture of Parez 613 and Latex 512R containing equal parts of each resin in a ratio of 1 part resin solids, 1 part water, and 2 parts of the photo-conductor. An eminently satisfactory electrophotographic recording element results.

EXAMPLE V

This example differs from Example I in that it involves the use of lead sulfide as the photo-conductor and the use of a resin mixture of Parez 613 and Latex 512R containing equal parts of each resin in a ratio of 1 part resin solids, 1 part water, and 2 parts of the photoconductor. An eminently satisfactory electrophotographic recording element results.

EXAMPLE VI

This example differs from Example I in that it involves the use of zinc sulfide as the photo-conductor and the use of a resin mixture of Parez 613 and Latex 512R containing equal parts of each resin in a ratio of 1 part resin solids, 1 part water, and 2 parts of the photoconductor. An eminently satisfactory electrophotographic recording element results.

EXAMPLE VII 600 parts of zinc oxide are dispersed in 200 parts of Parez 613 dissolved in 1,000 parts of water. After thorough mixing for about 45 minutes, the zinc oxide dispersion is coated on aluminum foil to a thickness of 0.005 inch. The coated aluminum foil is heated to a temperature of about 250° F. for about 5 minutes to effect the curing of the resin. An electrophotographic recording element results which is eminently satisfactory for use in producing electrostatic copies.

EXAMPLES VIII, IX, X, XI

These examples differ respectively from Example I in that instead of the 325 parts of polyvinyl acetate resin emulsion used in Example I, Example VIII involves the use of 300 parts of vinylidene chloride vinyl chloride copolymer. Example IX involves the use of 350 parts of vinylidene chloride acrylonitrile copolymer, Example X involves the use of acrylonitrile butadiene copolymer and Example XI involves the use of Lytron 680, interpolymers of 2-ethylhexyl acrylate, styrene acrylonitrile and methacrylic acid. Otherwise the conditions are the same and the results substantially the same.

It will be noted that the present invention provides a process of producing electrophotographic recording members free of the objections inherent in the use of organic solvents, which process requires no special coating equipment for its practice and no special safety or health precautions, and which process results in electrophotographic recording members having good electrical properties including low dark decay and good insulating properties and also having the electrically-insulating resinous layer firmly bonded to the substrate.

Since certain changes in carrying out the process and certain modifications in the electrophotographic recording element embodying this invention may be made without departing from the scope of the invention, it is intended that all matter contained in the above description shall be interpreted as illustrative and not in a limiting sense.

What is claimed is:

1. The method of producing an electrophotographic recording member which comprises coating a substrate with a suspension of finely divided electrophotographic photoconductor from the group consisting of the oxides, iodides, selenides, sulfides and tellurides of zinc, antimony, aluminum, bismuth, cadmium, mercury, molybdenum and lead, selenium, arsenic trisulfide, lead chromate and cadmium arsenide in an aqueous medium containing from 45% to 65% by weight of total resin solids present of a melamine-formaldehyde resin having at least 2 mols of formaldehyde per mol of melamine condensed therein and from 35% to 65% by weight of total resin solids present of a thermoplastic resin from the group consisting of vinyl acetate homopolymers, vinyl acetate octylacrylate copolymers, vinyl acetate vinyl chloride copolymers, vinylidene chloride vinyl chloride, copolymers, vinylidene chloride acrylonitrile copolymers, acrylonitrile-butadiene copolymers, styrene-butadiene copolymers, interpolymers of 2-ethylhexyl acrylate, styrene, acrylonitrile and methacrylic acid, the ratio of said photoconductor to said resins in said suspension, on a dry basis, being within the range of from 1 to 1 to 8 to 1 parts by weight, and thereafter heating the coated substrate to effect curing of the melamine-formaldehyde resin and produce a photo-conductive insulating layer having the photoconductor particles imbedded therein, said layer being continuous and firmly bonded to the substrate.

2. The method of producing an electrophotographic recording member which comprises coating a substrate with a suspension of finely divided zinc oxide photoconductor in an aqueous medium containing from 45% to 65% by weight of total resin solids present of a melamine-formaldehyde resin having at least 2 mols of formaldehyde per mol of melamine condensed therein and from 35% to 65% by weight of total resin solids present of a thermoplastic resin from the group consisting of vinyl acetate homopolymers, vinyl acetate octylacrylate copolymers, vinyl acetate vinyl chloride, copolymers, vinylidene chloride vinyl chloride copolymers, vinylidene chloride acrylonitrile copolymers, acrylonitrile-butadiene copolymers, styrene-butadiene copolymers, interpolymers of 2-ethylhexyl acrylate, styrene, acrylonitrile and methacrylic acid, the ratio of said photo-condutor to said resins in said suspension, on a dry basis, being within the range of from 1 to 1 to 8 to 1 parts by weight, and thereafter heating the coated substrate to effect curing of the melamine-formaldehyde resin and produce a photo-conductive insulating layer having the photo-conductor particles imbedded therein, said layer being continuous and firmly bonded to the substrate.

3. The method as set forth in claim 2, in which the melamine-formaldehyde resin is added to an emulsion of the thermoplastic resin in water and the photo-conductor is suspended in the resultant mixture.

4. An electrophotographic recording member comprising a substrate having firmly bonded thereon a continuous photo-conductive insulating layer comprising electrophotographic photo-conductor particles from the group consisting of the oxides, iodides, selenides, sulfides and tellurides of zinc, antimony, aluminum, bismuth, cadmium, mercury, molybdenum and lead, selenium, arsenic trisulfide, lead chromate and cadmium arsenide imbedded in a resinous layer, the resinous material of said layer imparting the electrically-insulating properties thereto consisting essentially of melamine-formaldehyde resin having at least 2 mols of formaldehyde per mol and melamine condensed therein, and the ratio of said electrophotographic photo-conductor particles to said melamine-formaldehyde resin present in said layer, on a dry basis, being within the range of from 1 to 1 to 8 to 1 parts by weight.

5. An electrophotographic recording member comprising a substrate having firmly bonded thereon a continuous photo-conductive insulating layer comprising zinc oxide photo-conductor particles imbedded in a resinous layer, the resinous material of said layer imparting the electrically-insulating properties thereto consisting essentially of melamine-formaldehyde resin having at least 2 mols of formaldehyde per mol of melamine condensed therein, and the ratio of said electrophotographic photo-conductor particles to said melamine-formaldehyde resin present in said layer, on a dry basis, being within the range of from 1 to 1 to 8 to 1 parts by weight.

6. An electrophotographic recording member comprising a substrate having firmly bonded thereto a continuous photo-conductive insulating layer comprising electrophotographic photo-conductor particles from the group consisting of the oxides, iodides, selenides, sulfides and tellurides of zinc, antimony, aluminum, bismuth, cadmium, mercury, molybdenum and lead, selenium, arsenic trisulfide, lead chromate and cadmium arsenide imbedded in a resinous layer consisting of from 45% to 65% by weight of total resin solids present, on a dry basis, of melamine-formaldehyde resin having at least 2 mols of formaldehyde per mol of melamine condensed therein and from 35% to 55% by weight of total resin solids present of at least one resin from the group consisting of vinyl acetate homopolymers, vinyl acetate octylacrylate copolymers, vinyl acetate vinyl chloride copolymers, vinylidene chloride vinyl chloride copolymers, vinylidene chloride acrylonitrile copolymers, acrylonitrile-butadiene copolymers, styrene-butadiene copolymers, interpolymers of 2-ethylhexyl acrylate, styrene, acrylonitrile and methacrylic acid, and the ratio of said electrophotographic photo-conductor to said resins present in said layer, on a dry basis, being within the range of from 1 to 1 to 8 to 1 parts by weight.

7. An electrophotographic recording member comprising a substrate having firmly bonded thereto a continuous photo-conductive insulating layer comprising zinc oxide photo-conductor particles imbedded in a resinous layer consisting of from 45% to 65% by weight of total resin solids present, on a dry basis, of melamine-formaldehyde resin having at least 2 mols of formaldehyde per mol of melamine condensed therein and from 35% to 55% by weight of total resin solids present of at least one resin from the group consisting of vinyl acetate homopolymers, vinyl acetate octylacrylate copolymers, vinyl acetate vinyl chloride copolymers, vinylidene chloride vinyl chloride copolymers, vinylidene chloride acrylonitrile copolymers, acrylonitrile-butadiene copolymers, styrene-butadiene copolymers, interpolymers of 2-ethylhexyl acrylate, styrene, acrylonitrile and methacrylic acid, and the ratio of said electrophotographic photo-conductor to said resins present in said layer, on a dry basis, being within the range of from 1 to 1 to 8 to 1 parts by weight.

8. An electrophotographic recording member comprising a paper base having firmly bonded thereto a condensed photo-conductive insulating layer comprising zinc oxide photo-conductor particles imbedded in a resinous layer consisting of a cured mixture of melamine-formaldehyde resin having at least 2 mols of formaldehyde per mol of melamine condensed therein and an interpolymer of 2-ethylhexyl acrylate, styrene, acrylonitrile and methacrylic acid in the proportions of from 35% to 55% of said interpolymer to 65% to 45% by weight of said melamine-formaldehyde resin, the ratio of zinc oxide to resin solids, on a dry basis, in said layer being within the range of from 1 to 1 to 8 to 1 parts by weight.

9. The method of producing an electrophotographic recording member which comprises coating a substrate with a suspension of finely divided electrophotographic photo-conductor from the group consisting of the oxides, iodides, selenides, sulfides and tellurides of zinc, antimony, aluminum, bismuth, cadmium, mercury, molybdenum and lead, selenium, arsenic trisulfide, lead chromate and cadmium arsenide in an aqueous medium containing a melamine-formaldehyde resin having at least 2 mols of formaldehyde per mol of melamine condensed therein, the ratio of said photo-conductor to said melamine-formaldehyde resin in said suspension, on a dry basis, being within the range of from 1 to 1 to 8 to 1 parts by weight, the said melamine-formaldehyde resin being the essential resinous constituent of said aqueous medium imparting the electrically-insulating properties to the coating layer formed therefrom, and thereafter heating the coated substrate to effect curing of the melamine-formaldehyde resin and produce a photo-conductive insulating layer having the photo-conductor particles embedded therein, said layer being continuous and firmly bonded to the substrate.

10. The method of producing an electrophotographic recording member which comprises coating a substrate with a suspension of finely divided zinc oxide photo-conductor in an aqueous medium containing a melamine-formaldehyde resin having at least 2 mols of formaldehyde per mol of melamine condensed therein, the ratio of said zinc oxide to said melamine-formaldehyde resin in said suspension, on a dry basis, being within the range of from 1 to 1 to 8 to 1 parts by weight, the said melamine-formaldehyde resin being the essential resinous constituent of said aqueous medium imparting the electrically-insulating properties to the coating layer formed therefrom, and thereafter heating the coated substrate to effect curing of the melamine-formaldehyde resin and produce a photo-conductive insulating layer having the zinc oxide particles embedded therein, said layer being continuous and firmly bonded to the substrate.

*11. The method of xerography which comprises the steps of electrostatically charging a plate having thereon a photoconductive insulating substance in a condensed irreversibly water-insoluble amine-formaldehyde resin applied by forming an aqueous composition consisting essentially of a photoconductive insulating substance and a water soluble aminoplast which is the condensation product of melamine and formaldehyde, applying said composition to a support to form a coating layer thereon, removing water from said layer and condensing the said aminoplast to an irreversibly water-insoluble resin, exposing said charged plate to a light image to form a latent electrostatic image and developing and fixing said latent image.*

References Cited in the file of this patent or the original patent

UNITED STATES PATENTS

| | | |
|---|---|---|
| 2,197,442 | Widmer | Apr. 6, 1940 |
| 2,322,888 | Schwartz et al. | June 29, 1943 |
| 2,399,489 | Landes | Apr. 30, 1946 |
| 2,557,266 | Dittmar et al. | June 19, 1951 |
| 2,719,831 | Craemer et al. | Oct. 4, 1955 |
| 2,719,832 | Craemer et al. | Oct. 4, 1955 |
| 2,767,153 | Sutton | Oct. 16, 1956 |
| 2,875,054 | Griggs et al. | Feb. 24, 1959 |
| 2,997,387 | Tannebaum | Aug. 22, 1961 |
| 3,037,861 | Hoegl et al. | June 5, 1962 |
| 3,041,165 | Sus et al. | June 26, 1962 |

FOREIGN PATENTS

| | | |
|---|---|---|
| 201,301 | Australia | Mar. 19, 1956 |
| 1,136,146 | France | May 9, 1957 |
| 562,336 | Belgium | May 13, 1958 |

OTHER REFERENCES

Metcalfe et al.: Journal of the Oil & Colour Chemists Assn., vol. 39, #11, pages 845–856.

Wainer: Photographic Engineering, vol. 3, #1, pages 12–22 (1952).

Barron: Modern Plastics, Chapmen & Hall (1949), pages 240–253.